US012552025B1

(12) United States Patent
Singh

(10) Patent No.: US 12,552,025 B1
(45) Date of Patent: Feb. 17, 2026

(54) REMOTE DEVELOPMENT OF EMBEDDED SYSTEMS

(71) Applicant: Amazon Technologies, Inc., Seattle, WA (US)

(72) Inventor: Adi Singh, Munich (DE)

(73) Assignee: Amazon Technologies, Inc., Seattle, WA (US)

( * ) Notice: Subject to any disclaimer, the term of this patent is extended or adjusted under 35 U.S.C. 154(b) by 514 days.

(21) Appl. No.: 17/806,417

(22) Filed: Jun. 10, 2022

(51) Int. Cl.
*B25J 9/16* (2006.01)
*B25J 13/00* (2006.01)
*G06Q 10/02* (2012.01)
*G06Q 10/0631* (2023.01)
*H04L 47/70* (2022.01)

(52) U.S. Cl.
CPC .......... *B25J 9/1656* (2013.01); *B25J 13/006* (2013.01); *G06Q 10/02* (2013.01); *G06Q 10/06311* (2013.01); *H04L 47/825* (2013.01); *H04L 47/827* (2013.01)

(58) Field of Classification Search
CPC ....... B25J 9/1656; B25J 13/006; G06Q 10/02; G06Q 10/06311; H04L 47/825; H04L 47/827
See application file for complete search history.

(56) References Cited

U.S. PATENT DOCUMENTS

| 8,799,354 | B2 | 8/2014 | Thomas et al. | |
| 10,277,531 | B2 | 4/2019 | Jackson | |
| 10,279,476 | B2 | 5/2019 | Jaekel et al. | |
| 10,701,145 | B1* | 6/2020 | Islam | G06F 9/546 |
| 2005/0050148 | A1* | 3/2005 | Mohammadioun | H04L 51/224 |
| | | | | 726/4 |
| 2008/0046121 | A1 | 2/2008 | Pao et al. | |
| 2015/0326500 | A1* | 11/2015 | Jackson | G06F 9/5027 |
| | | | | 709/226 |
| 2016/0337412 | A1* | 11/2016 | Duby | H04L 63/101 |
| 2019/0327309 | A1* | 10/2019 | Henning | G06F 16/951 |
| 2019/0342170 | A1* | 11/2019 | Pathak | H04L 67/34 |
| 2020/0102926 | A1* | 4/2020 | Jaggi | H04W 4/40 |

(Continued)

OTHER PUBLICATIONS

Brake, "BEC Systems-Remote access for embedded systems behind a firewall", Jan. 9, 2009. (Year: 2009).*

*Primary Examiner* — Brian J. Gillis
*Assistant Examiner* — Chhian (Amy) Ling
(74) *Attorney, Agent, or Firm* — S. Scott Foster; Kowert, Hood, Munyon, Rankin & Goetzel, P.C.

(57) ABSTRACT

A system for remote development of a robotic device is described. The robotic device comprising an embedded computing system and one or more subsystems, wherein the embedded computing system is programmable to control performance of respective operations of the one or more subsystems. The system includes a network tunneling system to receive, via an interface, one or more requests to specify an access configuration for the robotic device. The network tunneling system also receives a request to start a development session on the robotic device for a remote client. The network tunneling system evaluates the access configuration to determine that the request for the development session is permitted. The network tunneling system establishes a managed connection between the remote client and the embedded computing system of the robotic device to start the development session.

20 Claims, 8 Drawing Sheets

(56) References Cited

U.S. PATENT DOCUMENTS

| | | | | |
|---|---|---|---|---|
| 2020/0153967 A1* | 5/2020 | Cermak | ................. | H04L 67/12 |
| 2021/0158814 A1* | 5/2021 | Hussain | .................... | G06F 9/54 |
| 2021/0392142 A1* | 12/2021 | Stephens | ............... | H04L 63/104 |

* cited by examiner

*Tunnel Interface 500*

Schedule 510

| Devices 412 | Status | Sun | Mon | Tue | Wed | Thur | Fri | Sat |
|---|---|---|---|---|---|---|---|---|
| Robot 1 | O | User 1 | | | User 3 | | | |
| Robot 2 | O | User 2 | | | | | User 2 | |
| Robot 3 | X | | | User 4 | | | User 1 | |
| Robot 4 | O | User 3 | User 1 | | User 2 | | User 4 | |

Terminal 520 user@robot1:~$

Camera Feed 530

*First Camera 532*

*Second Camera 534*

REMOTE DEVELOPMENT OF EMBEDDED SYSTEMS

BACKGROUND

Engineers and developers may configure and program robotic devices by loading program code onto hardware that form the devices. The developer may have physical access to a robotic device in close physical proximity. The program code may be loaded onto the devices based on a hardware connection between the developer's computer and the device. In some instances, the computer and the robotic device may have a wireless connection via a local connection, such as Bluetooth or a wireless local area network (e.g., WiFi connection). The developer may enter the program code in a terminal or software development environment to be sent via the connection to the robotic device.

More developers are working from remote locations that are remotely connected to offices or labs where development had previously occurred. The remote developers may connect to the offices or labs via the public Internet while the connections may be secured according to information security technologies. Shared resources such as the robotic device may cause conflicts between remote developers who may be trying to access the robotic device at the same time as another remote developer.

Figure 1:
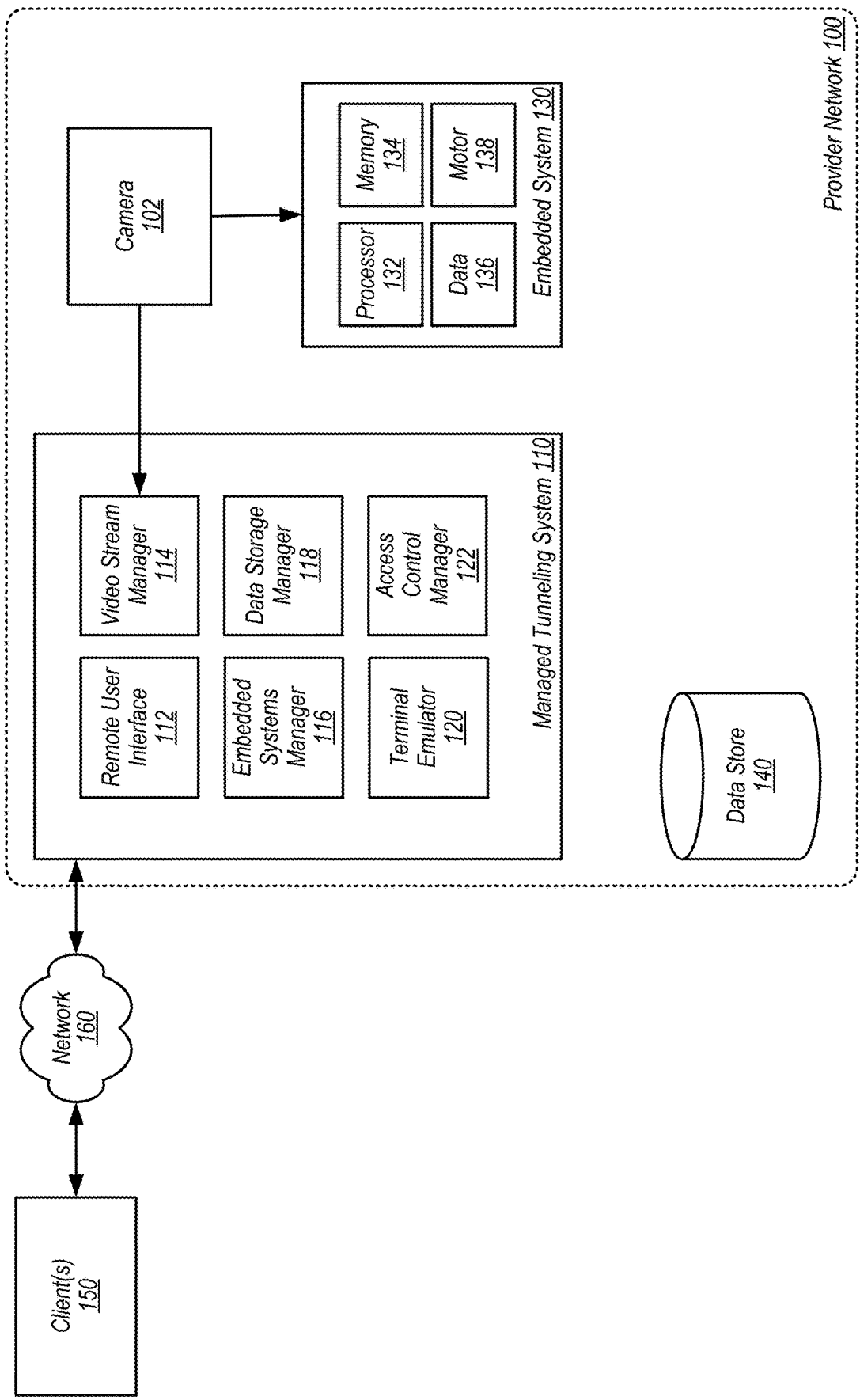
FIG. 1 illustrates a block diagram of a provider network that includes a managed tunneling system configured to establish a tunnel connection via a network between an embedded system and one or more clients, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various systems and methods for remote development of embedded devices are described herein. Embedded devices may include robotic devices, commonly referred to as robots, configured to perform tasks in a physical environment. For example, the robotic devices may be configured to interact with one or more objects in the physical environment. Some robotic devices may be configured to move an object from a first area to a second area. Other robotic devices may include vacuum robots configured to automatically vacuum the physical environment without direct interaction from a user.

Developers and engineers may configure and program the robotic devices with communicative access to the robotic devices. In some situations, the developers may provide program code to the robotic devices via a communication channel between the developers and the robotic devices. A tunnel service may be configured to establish the communication channel between the developers and the robotic devices. The tunnel service may establish a virtual private connection to the robotic devices. The robotic devices may otherwise be inaccessible directly via the public Internet to enforce security protocols and to limit access by unknown actors.

The tunnel service may provide an interface to provide status information regarding the robotic devices. The interface may also include a terminal to access the robotic devices. The terminal may facilitate direct access of the robotic devices from a remote location, such as a different location from a facility where the robotic devices are located. The developers may be located in another location, such as the remote location, while the robotic device is accessible through at least the Internet. The developers may connect to the tunnel service via the Internet to gain access to a private intranet communicatively coupled to the robotic devices. The terminal may receive input from the developers and transmit the inputs to the robotic devices.

The tunnel service may also provide remote access to multiple robotic devices across multiple geographic regions. A first robotic device may be located in a first location while a second robotic device may be located in a second location that is located in a different geographic service region from the first location.

The tunnel service may schedule access by individual developers such that multiple developers are not able to access a given robotic device at the same time. A developer may attempt to connect to the tunnel service to access the given robotic device. The tunnel service may determine whether the current time is within a reservation period for the developer and the given robotic device. If the current time is within the reservation period, then the tunnel service may establish a tunnel connection between the developer and the given robotic device. When the reservation period has elapsed, the tunnel service may terminate the tunnel connection. In some situations, the tunnel service may cause the given robotic device to reset to a default state. In other situations, the given robotic device may retain any changes that have been applied during the reservation period for another developer to continue development.

In one aspect, a system is described. The system may include a robotic device having an embedded computing system and one or more subsystems, wherein the embedded computing system is programmable to control performance of respective operations of the one or more subsystems. The system may also include a network tunneling system, comprising one or more computing devices. The network tunneling system may receive, via an interface, one or more requests to specify an access configuration for the robotic device. The network tunneling system may also receive a request to start a development session on the robotic device for a remote client. The network tunneling system may further evaluate the access configuration to determine that the request for the development session is permitted. The network tunneling system may establish a managed connection between the remote client and the embedded computing system of the robotic device to start the development session.

In another aspect, a method is described. The method may include receiving, at a managed tunneling system via an interface, a request to start a remote access session on an embedded computing system for a remote client. The method may also include determining, by the managed tunneling system, that the request to start the remote access session is permitted according to an access configuration specified for the embedded computing system via an interface of the managed tunneling system, wherein the access configuration determines access controls for a plurality of different remote clients including the remote client. The method may further include establishing, by the managed tunneling system, a managed connection between the remote client and the embedded computing system of the embedded computing system according to the access controls to start the development session.

In yet another aspect, one or more computer-readable storage media are described. The one or more computer-readable storage media stores instructions that, when executed on or across one or more processors, cause the one or more processors to perform operations. The operations may include in response to a request to start a remote access session on an embedded computing system for a remote client, determining that the request to start the remote access session is permitted according to an access configuration specified for the embedded computing system via an interface of the managed tunneling system, wherein the access configuration determines access controls for a plurality of different remote clients including the remote client. The operations may also include establishing a managed connection between the remote client and the embedded computing system according to the access controls to start the development session.

FIG. 1 illustrates a block diagram of a provider network 100 that includes a managed tunneling system 110 configured to establish a tunnel connection via a network 160 between an embedded system 130 and one or more clients 150, according to some embodiments. The embedded system 130 may be located in a first location, and the client 150 may be located in a second location that is different from the first location such that the client 150 may be referred to as being in a remote location from the embedded system 130. The tunnel connection may facilitate a development session between the clients 150 and the embedded system 130, according to some embodiments. The network 160 may include the public Internet such that the client 150 may be connected to the managed tunneling system 110 and the provider network 100 via the public Internet.

The managed tunneling system 110 may include one or more subsystems configured to perform various functions relating to tunnel connections between the client 150 and the embedded system 130, according to some embodiments. For example, the subsystems may include a remote user interface 112. In some embodiments, the remote user interface 112 may provide information pertaining to the embedded system 130 to the client 150. For example, the remote user interface 112 may indicate status information about the embedded system 130, such as an online or offline status of the embedded system 130. As another example, the status information may indicate that the embedded system 130 is currently processing other tasks and is unavailable to receive additional commands. The private address of the embedded system 130 may be unknown to the client 150. In some embodiments, the managed tunnel connection to the embedded system 130 may prevent elevated commands, such as commands requiring a password or super user status.

The remote user interface 112 may be configured to receive input from the client 150, according to some embodiments. For example, the remote user interface 112 may be configured to receive program code or instructions from the client 130. Additionally, the remote user interface 112 may be configured to transmit the program code or instructions to the embedded system 130 according to an internal interface between the managed tunneling system 110 and the embedded system 130.

The managed tunneling system 110 may provide a video of the embedded system 130 via the remote user interface 112, according to some embodiments. For example, a camera 102 may be located in the first location with the embedded system 130 and configured to capture a video data stream of the embedded system 130 in an environment of the first location. The camera 102 may be configured to provide captured video to a video stream manager 114 of the managed tunneling system 110, according to some embodiments. The video stream manager 114 may apply one or more video codecs to video from the camera 102 to improve bandwidth efficiency. For example, the video codecs may include one or more of H. 264, H. 265/High Efficiency Video Coding (HEVC), MPEG-4, DivX, XviD, or any other suitable video codec for streaming video. The video stream manager 114 may provide the video data stream to the client 150. For example, the video data stream may be included as part of the remote user interface 112.

The managed tunneling system 110 may also include an embedded systems manager 116, according to some embodiments. The embedded systems manager 116 may manage the embedded system 130 and other embedded systems that are provided to the clients 150 on behalf of the provider network 100. In some embodiments, the embedded systems manager 116 may store metadata relating to the embedded system 130 and the other embedded systems that may be included as part of the provider network 100. For example, the embedded systems manager 116 may categorize the embedded system 130 and the other embedded systems based on one or more resource attributes relating to the respective embedded systems. The embedded systems manager 116 may group multiple embedded systems into fleets or sub-fleets of embedded systems based on various criteria. In some situations, a fleet or sub-fleet may be accessible by the client 150 based on access controls. The client 150 may establish the fleet or sub-fleet based on grouping requests sent to the managed tunneling system 110.

In some embodiments, the embedded systems manager 116 may indicate permissible commands that may be sent from the client 150 to the embedded system 130 during a development session. For example, the embedded systems manager 116 may prevent certain commands from being entered and sent to the embedded system 130. As an illustrative example, commands that require administrator-level permissions (e.g., commands requiring sudo) may be restricted to protect the core filesystem of the embedded system 130. As another example, commands that modify or remove particular files (e.g., system files) may be restricted to prevent a loss of functionality of the embedded system 130. In some embodiments, the embedded systems manager 116 may notify a system administrator that a restricted command was attempted. In other embodiments, the embedded systems manager 116 may provide a warning prompt indicating that the restricted command was entered and rejected. The embedded systems manager 116 may also terminate the tunnel connection between the client 150 and the embedded system 130. For example, the embedded systems manager 116 may terminate the tunnel connection after a threshold quantity of rejected commands have been entered.

The embedded systems manager 116 may log commands that have been issued by the client 150 to the embedded system 130, according to some embodiments. For example, the commands may be logged in a log such that one or more portions of the log may be examined, reviewed or replayed. The log may indicate that the commands were allowed or rejected. The log may indicate which client of the clients 150 issued a particular command to identify which client issued a potentially rejected command.

The managed tunneling system 110 may also include a data storage manager 118, according to some embodiments. The data storage manager 118 may be configured to store data and metadata to a data store, such as data store 140 of the provider network 100. The data store 140 may store data pertaining to the embedded system 130, such as identifying information, functionality information, authorized users, or other device-specific information.

The managed tunneling system 110 may also include a terminal emulator 120, according to some embodiments. The terminal emulator 120 may be configured to facilitate a secure connection between the client 150 and the embedded system 130. The terminal emulator 120 may provide terminal access to the embedded system 130. For example, the terminal emulator 120 may provide an MQ Telemetry Transport (MQTT) protocol for providing communications between the client 150 and the embedded system 130. As another example, the terminal emulator 120 may provide a Hypertext Transfer Protocol Secure (HTTPS) session between the client 150 and the embedded system 130. In some embodiments, the remote user interface 112 may include a terminal window provided by the terminal emulator 120. For example, the remote user interface 112 may provide the terminal window to transmit data between the client 150 and the embedded system 130.

An access control manager 122 may be configured to limit access to the embedded system 130, according to some embodiments. For example, the access control manager 122 may process connection requests sent by the client 150. The access control manager 122 may approve or deny the connection requests based on authorization information maintained for the embedded system 130. In some embodiments, the access control manager 122 may maintain a schedule that indicates periods of time in which particular clients are authorized to utilize the embedded system 130.

As an illustrative example, a first client of the clients 150 may be authorized to access the embedded system 130 during a reservation period of Monday, and a second client of the clients 150 may be authorized to access the embedded system a reservation period of Tuesday. If the first client attempts to access the embedded system 130 on Monday, the access control manager 122 may authorize the attempt. If the first client attempts to access the embedded system 130 on Tuesday, the access control manager 122 may deny the attempt based on the second client being authorized for Tuesday. In some embodiments, the schedule may be updated asynchronously in real-time or near real-time in response to various clients 150 sending scheduling requests. For example, the access control manager 122 may automatically update the schedule in response to a scheduling request to prevent a given reservation period from being overlapped or double booked with another client.

The access control manager 122 may terminate connections from clients 150 to the embedded system 130 based on reservation periods elapsing, according to some embodiments. For example, the access control manager 122 may terminate a connection for the first client based on the day rolling over from Monday to Tuesday. In some embodiments, the embedded system 130 may be reset to a previous state after the connection is terminated. For example, after the connection is terminated due to the reservation period elapsing, the embedded system 130 may be restored to a previous state from before the reservation period. In some embodiments, the previous state may include a default state of the embedded device 130. The default state may be recorded as part of data 136 of the embedded system 130. In other embodiments, the default state may be managed by the embedded systems manager 116 and applied upon terminating the connection. For example, in response to the access control manager 122 terminating the connection, the default state may be retrieved from the embedded systems manager 116 and applied to the embedded system 130. In other embodiments, the embedded system 130 may store data indicative of the default state.

The embedded system 130 may include multiple hardware components to perform tasks in an environment, according to some embodiments. For example, the embedded system 130 may include one or more processors 132, a memory 134, data 136, and a motor 138. The one or more processors 132 may be configured to perform computing operations. The memory 134 may store instructions that, when executed on or across the one or more processors 132, may cause the one or more processors to perform the computing operations. The data 136 may be stored on a non-volatile data store. The data 136 may include the instructions to send to the memory 134 for execution by the one or more processors 132. In some embodiments, the embedded system 130 may receive the instructions from the client 150 via the managed tunneling system 110. For example, the managed tunneling system 110 may receive the instructions via the remote user interface 112 or the terminal emulator 120, and the managed tunneling system 110 may provide the received instructions to the embedded system 130 to be stored as part of the data 136.

The embedded system 130 may physically move in the environment using one or more subsystems that include hardware components configured to displace the embedded system 130 through the environment, according to some embodiments. For example, the motor 138 may be coupled to one or more wheels to move the embedded system 130 in the environment. In other embodiments, the embedded system 130 may include other subsystems and hardware components configured to perform physical tasks in the environment. In some embodiments, the embedded system 130 may include optics hardware, such as a camera, a radar sensor, a lidar sensor, or an infrared sensor. In some embodiments, the instructions stored as the data 136 or in the memory 134 may be executed on or across the processor 132 to cause the motor 138 to actuate. In some embodiments, functions of the motor 138 may be performed by an actuator configured to actuate in response to instructions from the processor 132. For example, the instructions may direct the motor 138 or the actuator to move the embedded system 130 in a particular direction in response to a particular trigger condition. In some embodiments, the camera of the embedded system 130 may capture an image of an obstacle that may cause the motor 138 to redirect the embedded system 130 in another direction to avoid a collision.

Figure 2:
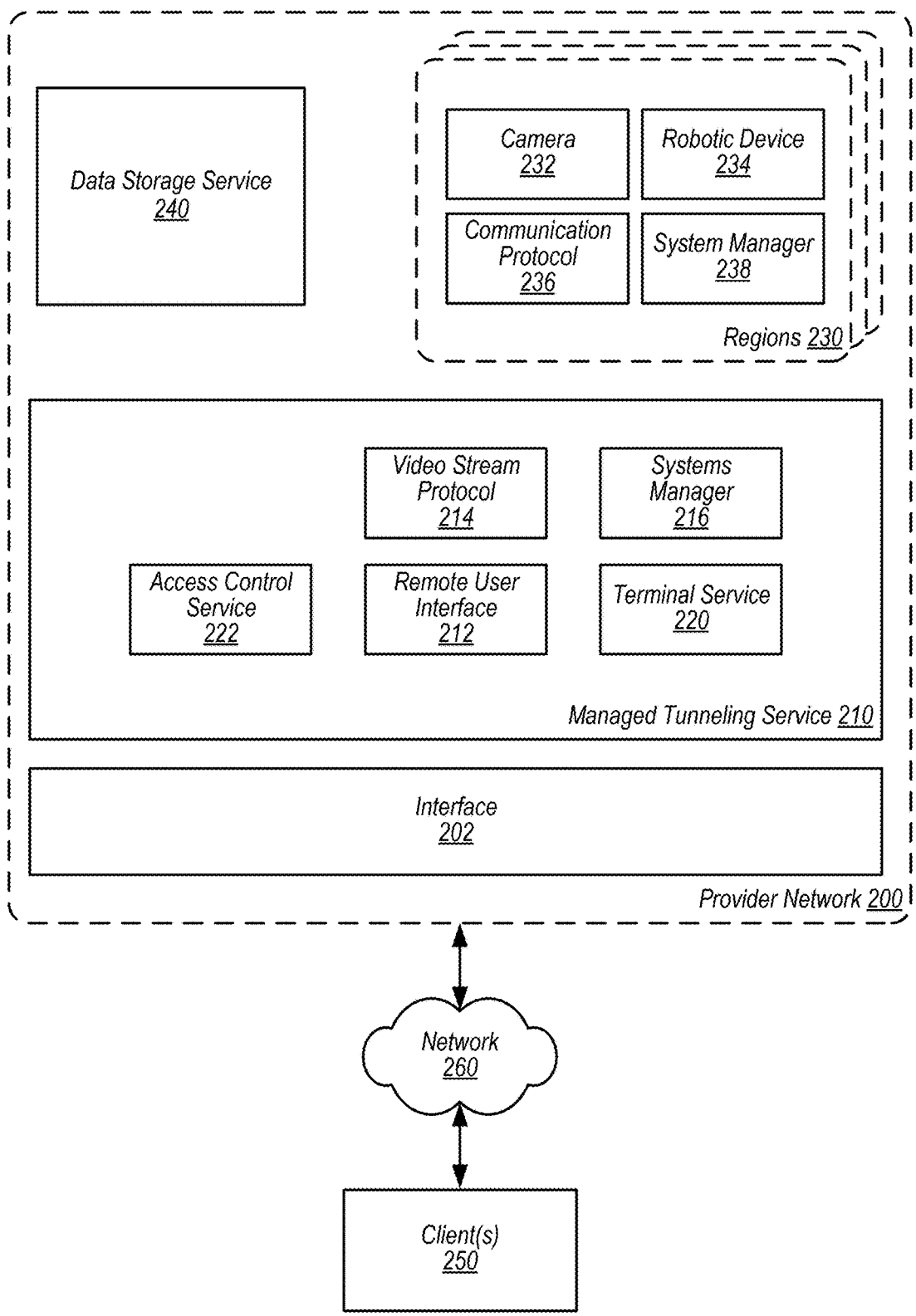
FIG. 2 illustrates a block diagram of a provider network configured to provide services to clients, according to some embodiments.

FIG. 2 illustrates a block diagram of a provider network 200 configured to provide services to clients 250, according to some embodiments. The provider network 200 may include an interface 202 configured to process requests and data transactions between the provider network 200 and the clients 250 via a network 260, according to some embodiments. The services may include a managed tunneling service 210 and a data storage service 240, in various embodiments. The provider network 200 may be implemented across multiple regions 230. In some implementations, the regions 230 may be initialized or spun up independently from other regions 230 or the managed tunneling service 210. For example, a given region of the regions 230 may be initialized to have lower latency operations between components in the given region.

Individual ones of the regions 230 may include a camera 232, a robotic device 234, a communication protocol 236, and a system manager 238, according to various embodiments. Each of the regions 230 may be accessible to the clients 250 in accordance with the managed tunneling service 210, according to various embodiments. The camera 232 may capture images or videos of an environment in a physical location associated with a given one of the regions 230. The robotic device 234 may be physically located within the environment associated with the given one of the regions 230. The regions 230 may communicate with the managed tunneling service 210 or other services of the provider network 200 according to a communication protocol 236, according to some embodiments. The system manager 238 for a given region of the regions 230 may maintain metadata for the robotic device 234 located within the given region.

The robotic device 234 may include various hardware components and subsystems to perform tasks in the environment. For example, the robotic device 234 may include a camera, such as the camera 232. The camera of the robotic device 234 may also be in addition to the camera 232 in various embodiments. The robotic device 234 may include a motor or an actuator configured to cause the robotic device to move in the environment.

The clients 250 may communicate with the provider network 200 according to the interface 202 to access the robotic device 234, according to some embodiments. The managed tunneling service 210 may establish a connection between the clients 250 and the robotic device 234 in response to a connection request from the clients 250. The managed tunneling service 210 may convey information pertaining to the robotic device 234 according to a remote user interface 212. For example, the information may include a video stream of the robotic device 234. In some embodiments, the video stream may be provided according to a video stream protocol 214. For example, the video stream protocol 214 may include one or more video codecs configured to provide the video stream to the remote user interface 212.

The remote user interface 212 may also include a terminal window provided by the managed tunneling service 210, according to some embodiments. For example, the managed tunneling service 210 may include a terminal service 220 to provide a Secure Shell Protocol (SSH) terminal communicatively coupled to the robotic device 234. The terminal service 220 may establish the SSH terminal via an internal interface between the robotic device 234 and the managed tunneling service 210, according to some embodiments. The managed tunneling service 210 may also include a systems manager 216, according to some embodiments. For example, the systems manager 216 may manage the various embedded devices 234 across the regions 230. The systems manager 216 may maintain metadata relating to the embedded devices 234.

The managed tunneling service 210 may also include an access control service 222, according to some embodiments. For example, the access control service 222 may limit access to the embedded devices 234 based on various criteria. The access control service 222 may determine whether a given client of the clients 250 may access the robotic device 234 based on a current time for when a request to connect is sent to the managed tunneling service 210. For example, the request to connect may have an associated timestamp that indicates the current time. The access control service 222 may determine whether the current time is within a reservation period for the client and the robotic device 234. Based on a determination that the current time is within the reservation period, the access control service 222 may grant authorize the request. The authorized request may cause a connection between the client and the robotic device 234 to be established via the managed tunneling service 210. Based on a determination that the current time is not within the reservation period for the client, the access control service 222 may deny the request and prevent a connection between the client and the robotic device 234.

Figure 3:
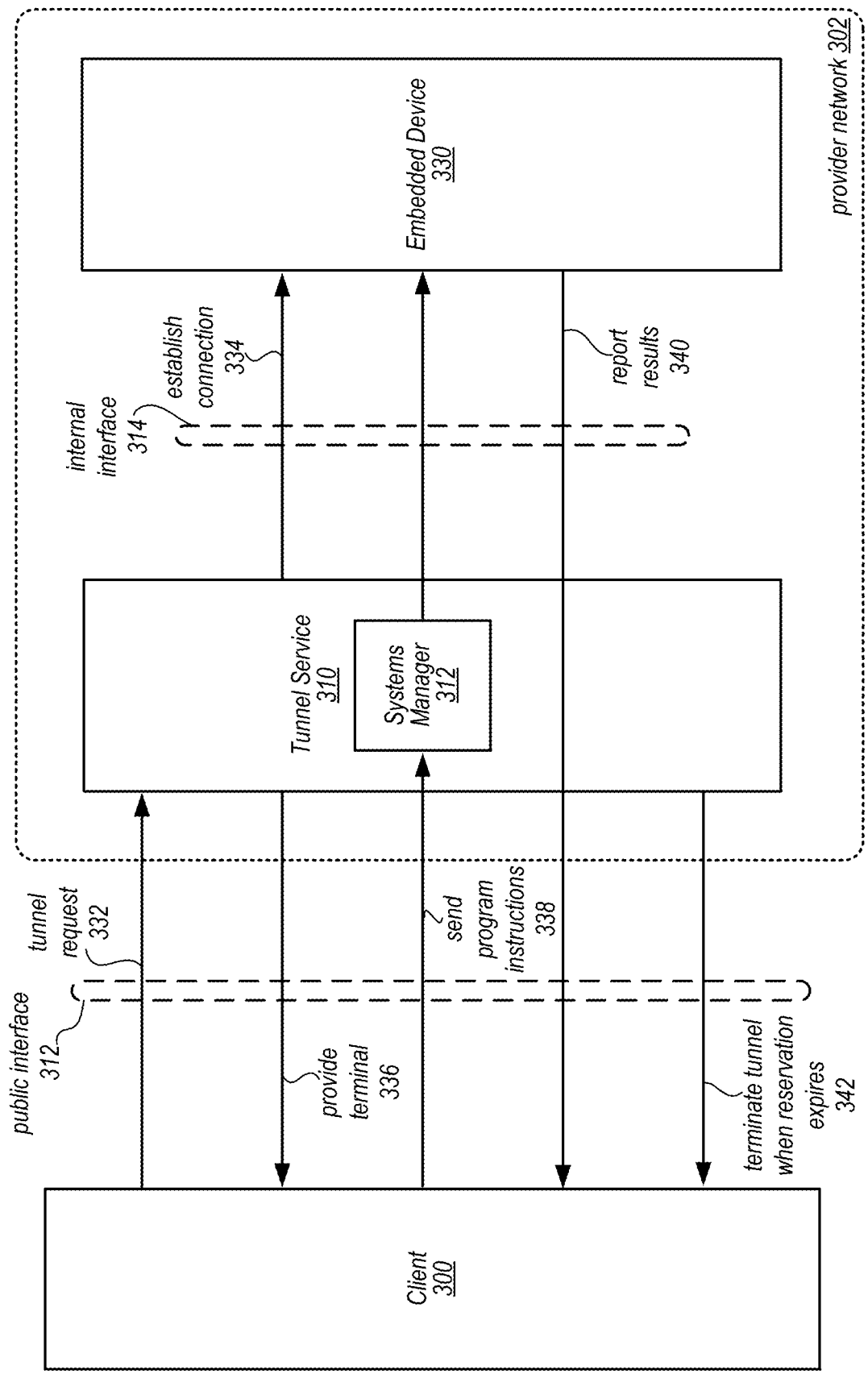
FIG. 3 is a data flow diagram showing interactions between a client and a provider network that includes a tunnel service and an embedded device, according to some embodiments.

FIG. 3 is a data flow diagram showing interactions between a client 300 and a provider network 302 that includes a tunnel service 310 and a robotic device 330, according to some embodiments. In some embodiments, the robotic device 330 may include an embedded device or an actuated device comprising one or more embedded systems and actuator subsystems.

The client 300 may send a tunnel request 332 to the tunnel service 310 in accordance with a public interface 312, according to some embodiments. The tunnel request 332 may include a request to connect to the robotic device 330. The tunnel service 310 may respond to the tunnel request 332 by establishing a connection 334 to the robotic device 330 according to an internal interface 314 in some embodiments.

The tunnel service 310 may also provide a terminal 336 to the client 300. The terminal 336 may provide real-time or near real-time communications between the client 300 and the robotic device 330. The terminal 336 may receive inputs from the client 300. For example, the terminal 336 may receive program instructions from the client 300. The client 300 may send the program instructions 338 to the robotic device 330 via the tunnel service 310. In some embodiments, the client 300 may send the program instructions 338 to a systems manager 312 of the tunnel service 310. The systems manager 312 may send the program instructions to the robotic device 330 on behalf of the client 300. In some embodiments, the systems manager 312 may verify that the program instructions are permitted by the tunnel service 310 to be sent to the robotic device 330.

The robotic device 330 may perform various operations based on the sent program instructions 338, according to various embodiments. For example, the robotic device 330 may include hardware components configured to change a physical position of the robotic device 330 within an environment. As another example, the robotic device 330 may include hardware components configured to physically manipulate an object in the environment.

The robotic device 330 may report results 340 of the operations to the client 300 via the tunnel service 310. The reported results 340 may be stored to a data store of one or both of the client 300 or the tunnel service 310. The client 300 may continue to send additional program instructions 338. The robotic device 330 may additionally report results 340. The reported results 340 may include feedback from one or more physical components of the robotic device 330, such as an actuator of the robotic device 340.

After a reservation time period elapses, the tunnel service 310 may terminate the tunnel connection 342, according to some embodiments. In some embodiments, the tunnel service 310 may provide a countdown timer to indicate that the tunnel connection is about to be closed. In other embodiments, the tunnel service 310 may disconnect the tunnel connection strictly when the reservation time period elapses. The tunnel service 410 may cause the embedded device to reset to a default state 344 based on the tunnel connection being closed, according to some embodiments. The tunnel service 310 may send an instruction to the robotic device 330 to reset to the default state. In other embodiments, the robotic device 330 may respond to an indication that the tunnel connection has closed and automatically restore to a previous state based on the previous state being saved to storage of the robotic device 330.

Figure 4:
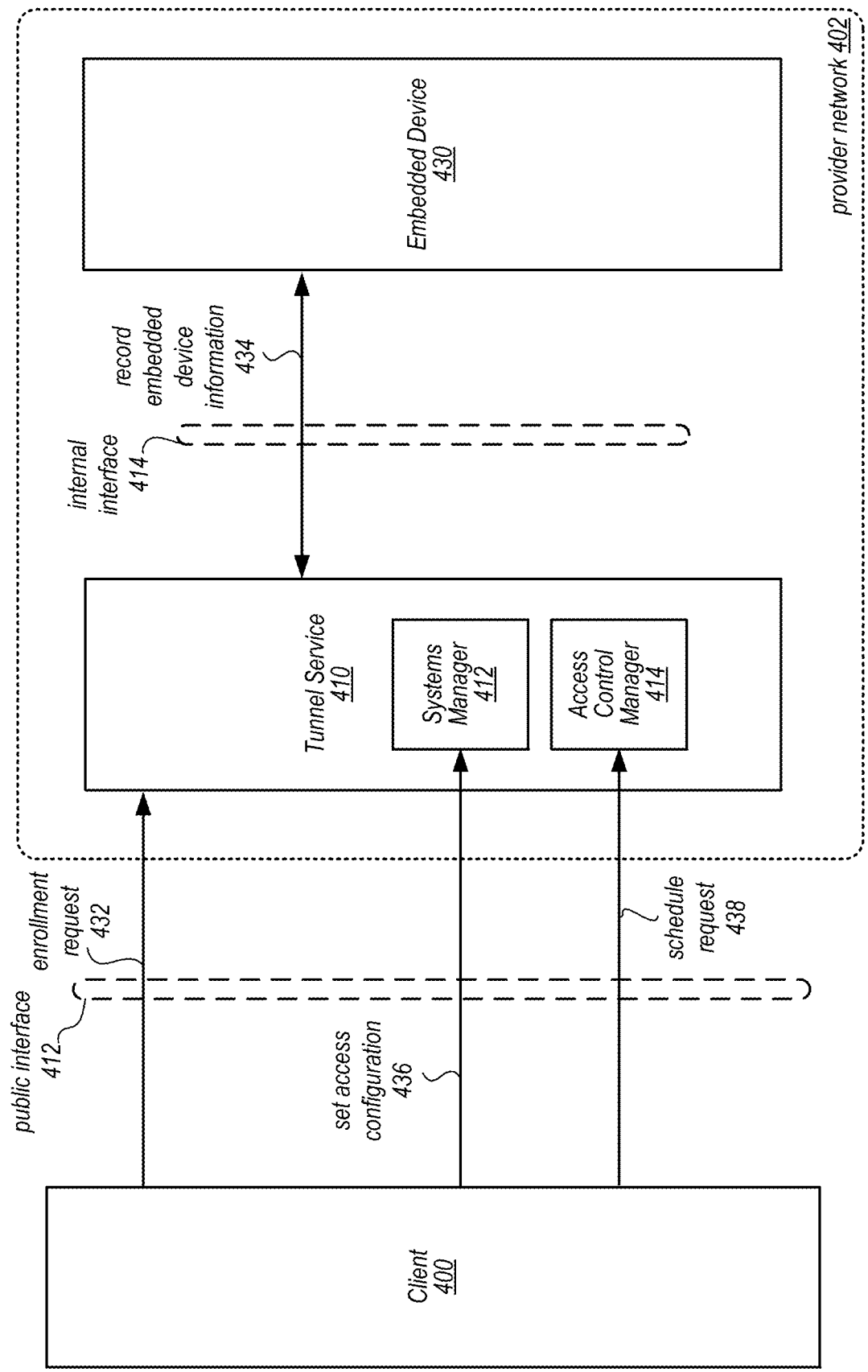
FIG. 4 is a data flow diagram showing interactions between a client and a provider network that includes a tunnel service and an embedded device, according to some embodiments.

FIG. 4 is a data flow diagram showing interactions between a client 400 and a provider network 402 that includes a tunnel service 410 and a robotic device 430, according to some embodiments. In some embodiments, the robotic device 430 may include an embedded device or an actuated device comprising one or more embedded systems and actuator subsystems.

The client 400 may send an enrollment request 432 to the tunnel service 410 in accordance with a public interface 412, according to some embodiments. The enrollment request 432 may include a request to add a new embedded device as a potential destination for tunnel connections established by the tunnel service 410. For example, the enrollment request 432 may indicate the robotic device 430 as a connection destination for the tunnel service 410. In response to the enrollment request 432, the tunnel service 410 may record embedded device information 434, according to some embodiments. For example, the tunnel service 410 may record information obtained from the robotic device 430 in accordance with an internal interface 414. As another example, the tunnel service 410 may communicate to the robotic device 430 that the robotic device 430 may be connected to a tunnel connection to a client, such as the client 400.

The client 400 may set an access configuration 436 with a systems manager 412 of the tunnel service 410, according to some embodiments. The access configuration may include access controls or permissions for accessing the robotic device 430 via the tunnel service 410. For example, the access configuration may include a roster of authorized clients, such as the client 400. The access configuration may also include access controls for commands that may or may not be executed at the robotic device 430 via the tunnel service 410. The systems manager 412 may be configured to enforce the access controls of the access configuration for the client 400 and other clients that may connect to the tunnel service 410 to access the robotic device 430.

The client 400 may send a schedule request 438 to an access control manager 414 of the tunnel service 410, according to some embodiments. The access control manager 414 may be configured to maintain a reservation schedule for periods of time when particular clients are authorized to access the robotic device 430. The schedule request 438 may be recorded by the access control manager 414 as a reservation period for the client 400. For example, the reservation schedule may indicate a reservation period during which the client 400 may have exclusive access to the robotic device 430 while another client is unable to access the robotic device 430. The reservation schedule may also include periods of time when there are not any reservations. The unreserved periods of time may allow access from the first client to attempt access until a reservation period begins or a time limit elapses. For example, the unreserved period of time may allow a client to access the robotic device 430 for a limited time even in situations which no reservation period occurs within the time limit. The client may be limited to a fixed time limit to prevent the client from locking access from other clients for an extended period of time. The client may renew access in response to a notification indicating that the period of time is about to elapse and expire.

Figure 5:
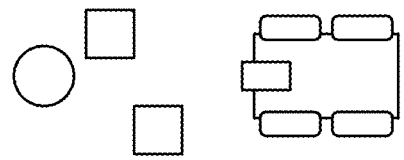
FIG. 5 is a block diagram of a tunnel interface presented to a client to interact with an embedded device, according to some embodiments.
Figure 5:
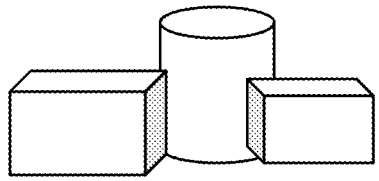

FIG. 5 is a block diagram of a tunnel interface 500 presented to a client to interact with an embedded device, according to some embodiments. The tunnel interface 500 may be provided as a remote user interface to the client. The tunnel interface 500 may include a schedule 510, a terminal 520, and a camera feed 530, according to some embodiments.

The schedule 510 may include reservation times for a plurality of devices 512, according to some embodiments. As an illustrative example, the devices 512 may include robot 1, robot 2, robot 3, and robot 5. The schedule 510 may also indicating a status 514 of each of the devices 512. For example, an 'O' may indicate that a given device is online, while an 'X' may indicate that a given device is offline. Other indicators may be used as alternatives. The schedule 510 may also include time periods that are allotted to different clients. For example, the schedule 510 may indicate that different users (e.g., User 1, User 2, User 3, or User 4) may have reservation time periods on various days. As depicted in FIG. 5, the schedule 510 may block out days for each user on a per-device basis. Other embodiments may have varying levels of granularity with respect to the time periods. For example, the schedule 510 may have reservation periods set by minutes, hours, or weeks. In some embodiments, the reservation period for a given user may preclude other users from accessing the given device. For example, on Sunday, only User 1 may access Robot 1, and attempted connections from other users may be rejected. The schedule 510 may also be configured to receive schedule requests from users. For example, User 1 may request a reservation for a particular day with a particular robot via a respective tunnel interface 500.

The terminal 520 may provide SSH access to the selected device of the devices 512, according to some embodiments. As an illustrative example, the terminal 520 may provide SSH access to Robot 1 such that commands may be sent from the tunnel interface 500 to be implemented by Robot 1. Robot 1 may also provide feedback or results from the commands via the terminal 520.

The camera feed 530 may include one or more video streams from corresponding cameras related to the selected device of the devices 512, according to some embodiments. For example, the video streams may include cameras related to Robot 1, such as a first camera 532 and a second camera 534. The first camera 532 may capture an overview of an environment where Robot 1 is located. The second camera 534 may be coupled to Robot 1 as an on-board camera configured to capture video from the perspective of Robot 1. In some embodiments, the tunnel interface 500 may implement one or more scripts to direct focus of the camera feed 530 to focus on movement of Robot 1 while moving through the environment. For example, when there are multiple cameras, as the robot is moving across different cameras' fields of view, the camera feed 530 may shift focus to another camera where Robot 1 is located. The system looks at movement in the frame to automatically switch the camera feed 530 to the camera with movement of Robot 1.

Figure 6:
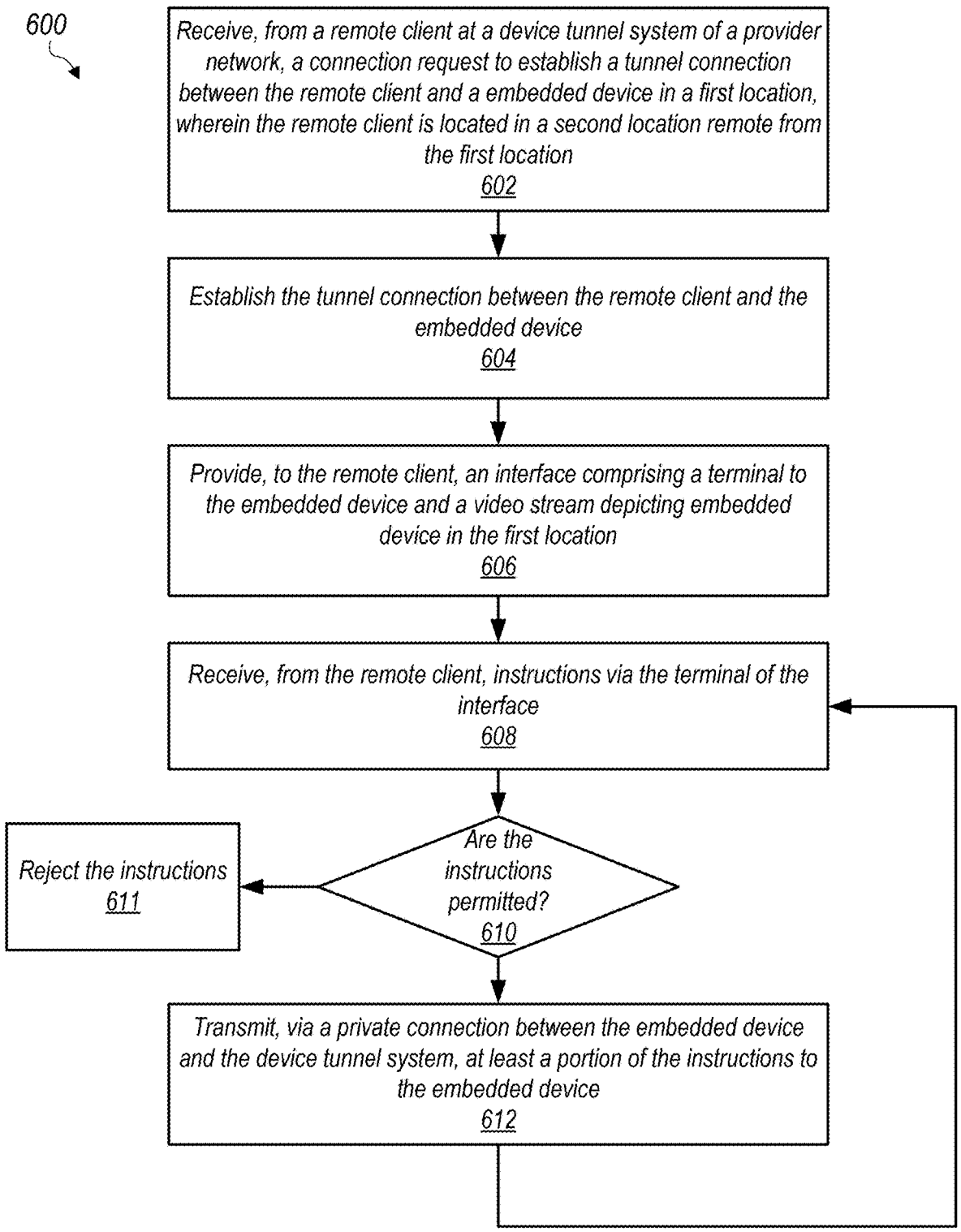
FIG. 6 illustrates a flowchart diagram of a method for establishing a secure tunnel connection between an embedded device and a remote client, according to some embodiments.

FIG. 6 illustrates a flowchart diagram of a method 600 for establishing a secure tunnel connection between an embedded device and a remote client, according to some embodiments. The method 600 may be implemented by one or more computing devices. In some embodiments, the method 600 may be performed by the managed tunneling system 110 of FIG. 1, the managed tunneling service 210 of FIG. 2, or the tunnel service 310 of FIG. 3. The embedded device may correspond to the embedded system 130 of FIG. 1, the robotic device 234 of FIG. 2, or the robotic device 330 of FIG. 3, according to various embodiments.

The method 600 may include receiving, from a remote client at a managed tunneling system of a provider network, a connection request to establish a tunnel connection between the remote client and an embedded device in a first location, wherein the remote client is located in a second location remote from the first location, at 602. In some embodiments, the managed tunneling system may receive the connection request according to a first interface between the remote client and the managed tunneling system. In some embodiments, the connection request may identify the embedded device to which the remote client wants to connect.

The method 600 may include establishing the tunnel connection between the remote client and the embedded device, at 604. In some embodiments, the managed tunneling system may establish a connection from the managed tunneling system to the remote client and establish a connection from the managed tunneling system to the embedded device. The connections may be bridged such that the remote client may communicate with the embedded device via the connections.

The method 600 may include providing, to the remote client, an interface comprising a terminal to the embedded device and a video stream depicting embedded device in the first location, at 606. The provided interface may include a remote user interface. The remote user interface may correspond to the remote user interface 112 of FIG. 1, the remote user interface 212 of FIG. 2, or the tunnel interface 400 of FIG. 4.

The method 600 may include receiving, from the remote client, instructions via the terminal of the interface, at 608. In some embodiments, the terminal may receive client inputs. For example, the terminal may receive text inputs provided by the client via the interface. The method 600 may also include transmitting, via a private connection between the embedded device and the managed tunneling system, at least a portion of the instructions to the embedded device, at 610. In some embodiments, the private connection may include a private interface configured to receive inputs from the managed tunneling system. In some embodiments, the private connection may not be accessible from the public Internet such that the remote client is unable to directly access the private connection without an intermediary, such as the managed tunneling system.

The method 600 may include causing the embedded device to perform additional functions according to the instructions, at 612. In some situations, the instructions may be executed on or across one or more processors of the embedded device to perform the additional functions. For example, the instructions may include program code that was provided via the terminal. In some embodiments, the remote client may provide an instruction to execute the program code at the embedded device. The method may return to 608 to continue receiving instructions via the terminal.

Figure 7:
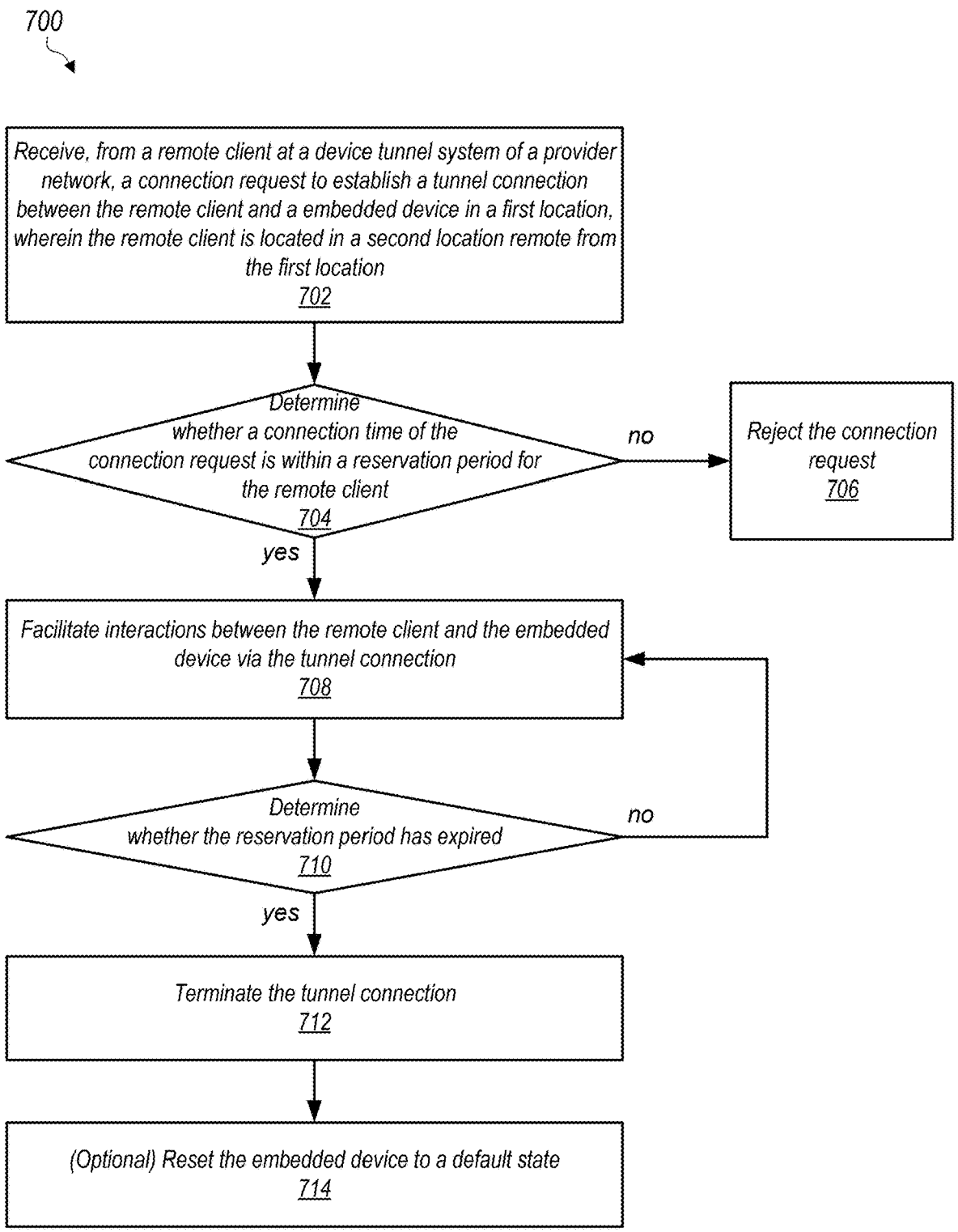
FIG. 7 illustrates a flowchart diagram of a method for managing tunnel connections between a remote client and an embedded device, according to some embodiments.

FIG. 7 illustrates a flowchart diagram of a method 700 for managing tunnel connections between a remote client and an embedded device, according to some embodiments. The method 700 may be implemented by one or more computing devices. In some embodiments, the method 700 may be performed by the managed tunneling system 110 of FIG. 1, the managed tunneling service 210 of FIG. 2, or the tunnel service 310 of FIG. 3. The remote client may correspond to the client 150 of FIG. 1, the clients 250 of FIG. 2, or the client 300 of FIG. 3, according to some embodiments. The embedded device may correspond to the embedded system 130 of FIG. 1, the robotic device 234 of FIG. 2, or the robotic device 330 of FIG. 3, according to various embodiments.

The method 700 may include receiving, from a remote client at a managed tunneling system of a provider network, a connection request to establish a tunnel connection between the remote client and an embedded device in a first location, wherein the remote client is located in a second location remote from the first location, at 702. In some embodiments, the remote client may send the connection request to the managed tunneling system according to a public interface between the remote client and then managed tunneling system.

The method 700 may include determining whether a connection time of the connection request is within a reservation period for the remote client, at 704. In some embodiments, the managed tunneling system may include a system clock to determine when the connection request is sent. For example, the managed tunneling system may apply a timestamp to the connection request based on the system clock. The current time at which the connection request is sent may be compared against a schedule that indicates respective reservation periods for respective clients. In some embodiments, the reservation period may be demarcated by a beginning time and an ending time. In other embodiments, the reservation period may be expressed as a unit of time. For example, the reservation period may be indicated as a day of the week, a month, or a specific hour. Based on a determination that the connection time of the connection request is not within the reservation period, the method 700 may conclude by rejecting the connection request, at 706.

Based on a determination that the connection time of the connection request is within the reservation period, the method 700 may facilitating interactions between the remote client and the embedded device via the tunnel connection, at 708. In some embodiments, the managed tunneling system may facilitate the interactions according to a terminal configured to receive inputs from the remote client and provide results or feedback from the embedded device. For example, the terminal may establish an SSH connection between the remote client and the embedded device. The interactions may continue throughout the reservation period.

The method 700 may include determining whether the reservation period has expired, at 710. In some embodiments, the managed tunneling system may determine a current time and compare the current time against the reservation period. For example, the reservation period may have an ending time, which is compared against the current time. Based on a determination that the reservation period has not expired, the method 700 may continue at 708 with additional interactions between the remote client and the embedded device.

Based on a determination that the reservation period has expired, the method 700 may include terminating the tunnel connection, at 712. In some embodiments, the managed tunneling system may be configured to terminate tunnel connections when respective reservation period expires. In some embodiments, the managed tunneling system may close the tunnel connection such that another remote client may use the embedded device. In some embodiments, the embedded device may be inaccessible by another remote client.

The method 700 may optionally include resetting the embedded device to a default state, at 714. After the reservation period has ended, the managed tunneling system may restore the embedded device according to the default state in storage.

Figure 8:
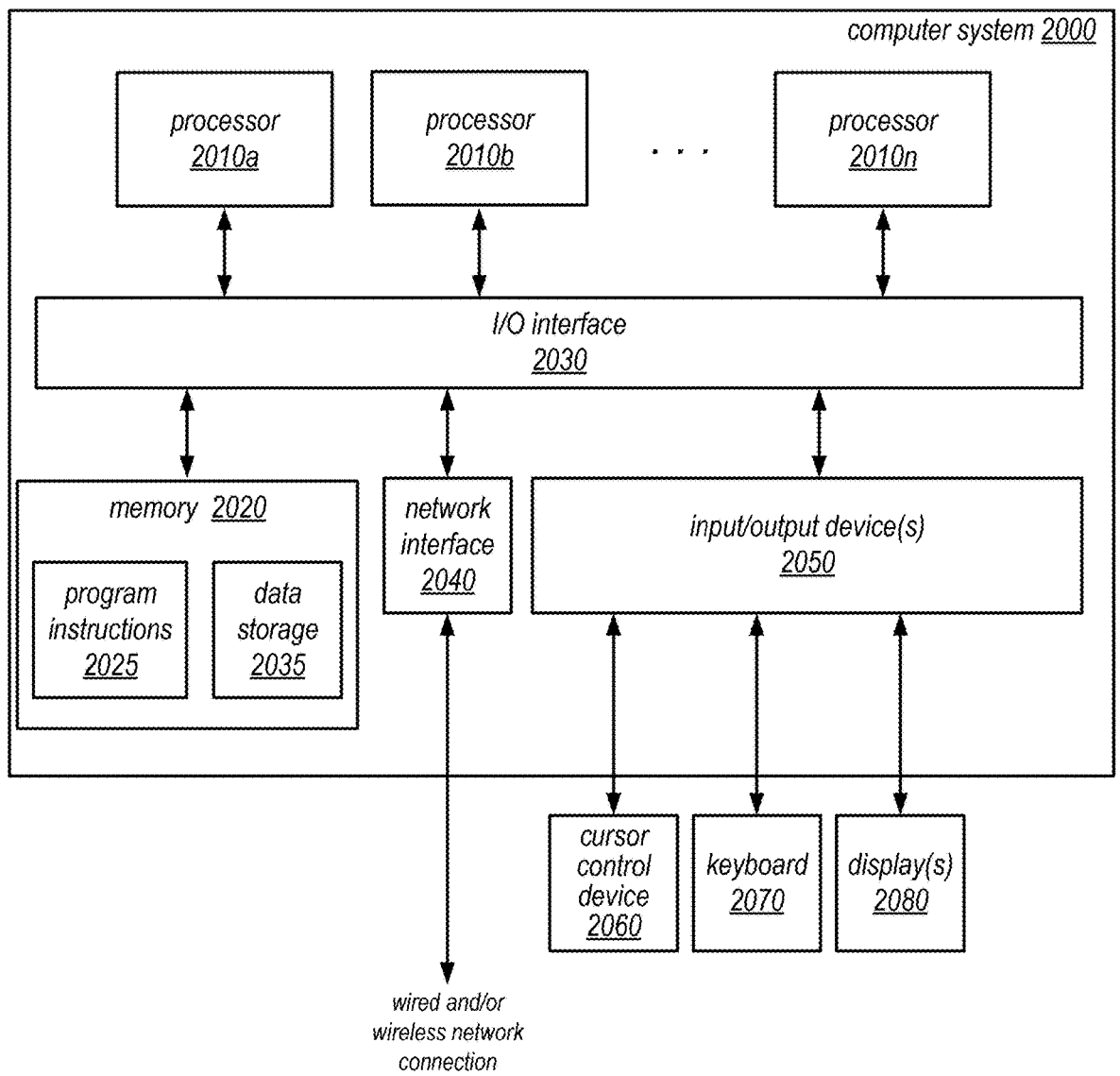
FIG. 8 illustrates a block diagram illustrating an example computer system that may be used in some embodiments.

As shown in FIG. 8, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present embodiments may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A system, comprising:
   a robotic device comprising an embedded computing system and one or more subsystems, wherein the embedded computing system is programmable to control performance of respective operations of the one or more subsystems; and
   a network tunneling system, comprising one or more computing devices, configured to:
      receive, via an interface, one or more requests to specify an access configuration for the robotic device;
      receive a request to start a development session on the robotic device for a remote client;
      evaluate the access configuration to determine that the request for the development session is permitted; and
      establish a managed connection between the remote client and the embedded computing system of the robotic device to start the development session, wherein the managed connection prevents an elevated command that requires a password and is received via the managed connection from being sent to and performed at the embedded computing system.

2. The system of claim 1, wherein to evaluate the access configuration to determine that the request for the development session is permitted, the network tunneling system is configured to evaluate a reservation schedule for the robotic device maintained as part of the access configuration.

3. The system of claim 2, wherein the network tunneling system is further configured to:
   terminate the managed connection between the embedded computing system and the remote client after determining that a period of time has elapsed.

4. The system of claim 3, wherein the network tunneling system is further configured to send a termination indication to the robotic device that indicates the managed connection has been terminated, and wherein the robotic device is further configured to, in response to the termination indication, reset the robotic device to a default state.

5. The system of claim 1, further comprising:
   a camera configured to:
      capture video data stream of the robotic device; and
      send the video data stream to the network tunneling system; and
   wherein the network tunneling system is further configured to send the video data stream to the remote client via the managed connection.

6. A method, comprising:
   receiving, at a managed tunneling system via an interface, a request to start a remote access session on an embedded computing system for a remote client;
   determining, by the managed tunneling system, that the request to start the remote access session is permitted according to an access configuration specified for the embedded computing system via an interface of the managed tunneling system, wherein the access configuration determines access controls for a plurality of different remote clients including the remote client; and
   establishing, by the managed tunneling system, a managed connection between the remote client and the embedded computing system according to the access controls to start the development session, wherein the managed connection prevents an elevated command that requires a password and is received via the managed connection from being sent to and performed at the embedded computing system.

7. The method of claim 6, wherein determining that the request to start the remote access session is permitted comprises evaluating a reservation schedule for the embedded computing system maintained as part of the access configuration.

8. The method of claim 7, further comprising:
   terminating the managed connection between the embedded computing system and the remote client after determining that a period of time has elapsed.

9. The method of claim 8, further comprising:
   sending a termination indication to the embedded computing system that indicates the managed connection has been terminated.

10. The method of claim 8, further comprising:
    resetting the embedded computing system to a previous state in response to terminating the managed connection between the embedded computing system and the remote client.

11. The method of claim 10, further comprising:
    sending a notification to an administrator indicating that the rejected command was received from the remote client.

12. The method of claim 7, further comprising:
    receiving an access modification request specifying one or more changes to the access configuration, wherein the one or more changes modify one or more of the reservation schedule, permitted clients, or command permissions for the embedded computing system.

13. The method of claim 6, further comprising:
    receiving, from the remote client via the interface, a command to be sent to the embedded computing system;
    determining whether the command is permitted according to the access configuration; and
    based on a determination that the command is not permitted, rejecting the command.

14. One or more computer-readable storage media storing instructions that, when executed on or across one or more processors, cause the one or more processors to:
    in response to a request to start a remote access session on an embedded computing system for a remote client via a managed tunneling system, determine that the request to start the remote access session is permitted according to an access configuration specified for the embedded computing system via an interface of the managed tunneling system, wherein the access configuration determines access controls for a plurality of different remote clients including the remote client; and
    establish a managed connection between the remote client and the embedded computing system according to the access controls to start the development session, wherein the managed connection prevents an elevated command that requires a password and is received via the managed connection from being sent to and performed at the embedded computing system.

15. The one or more computer-readable storage media of claim 14, wherein to determine that the request to start the remote access session is permitted, the one or more computer-readable storage media further comprises instructions that cause the one or more processors to:
    evaluate a reservation schedule for the embedded computing system maintained as part of the access configuration.

16. The one or more computer-readable storage media of claim 15, further comprising instructions that, when executed on or across the one or more processors, cause the one or more processors to:

terminate the managed connection between the embedded computing system and the remote client after determining that a period of time has elapsed.

17. The one or more computer-readable storage media of claim 16, further comprising instructions that, when executed on or across the one or more processors, cause the one or more processors to:

send a termination indication to the embedded computing system that indicates the connection has been terminated; and reset the embedded computing system to a previous state.

18. The one or more computer-readable storage media of claim 15, further comprising instructions that, when executed on or across the one or more processors, cause the one or more processors to:

in response to an access modification request specifying one or more changes to the access configuration, modify one or more of the reservation schedule, permitted clients, or command permissions of the access configuration for the embedded computing system.

19. The one or more computer-readable storage media of claim 14, further comprising instructions that, when executed on or across the one or more processors, cause the one or more processors to:

in response to receiving, from the remote client, a command to be sent to the embedded computing system, determine whether the command is permitted according to the access configuration; and based on a determination that the command is not permitted, reject the command.

20. The one or more computer-readable storage media of claim 14, further comprising instructions that, when executed on or across the one or more processors, cause the one or more processors to:

send a notification to an administrator indicating that the rejected command was received from the remote client.

\* \* \* \* \*